United States Patent [19]

Pilling et al.

[11] 3,855,421

[45] Dec. 17, 1974

[54] TELEPHONE SUBSCRIBER LINE CIRCUIT

[75] Inventors: Harold William Cliff Pilling, Madrid, Spain; Gerard Marcel Le Cardonnel, Neuilly sur-Seine (Hauts-de-Seine), France

[73] Assignee: International Standard Electric Corporation, New York, N.Y.

[22] Filed: Jan. 26, 1972

[21] Appl. No.: 220,987

[52] U.S. Cl. .......................................... 179/18 FA
[51] Int. Cl. .......................................... H04m 3/22
[58] Field of Search ...................... 179/18 F, 18 FA

[56] References Cited

UNITED STATES PATENTS 3,025,356 3/1962 Muroga et al. ................ 179/18 FA

FOREIGN PATENTS OR APPLICATIONS 1,300,976 8/1969 Germany ....................... 179/18 FA

*Primary Examiner*—Thomas W. Brown
*Attorney, Agent, or Firm*—D. P. Warner; J. B. Raden

[57] ABSTRACT

A line circuit includes a supply circuit connected to the line. The supply circuit comprises two feeding terminals, a loop test circuit, a diode connected between one of the line wires and the corresponding feed terminal, a resistive bias circuit connected to the same feed terminal and a current supply test circuit enabling the potential on this terminal to be evaluated and signalled. The current supply test circuit provides information which enables the indication provided by the loop test circuit to be interpreted to identify the condition of the line.

4 Claims, 2 Drawing Figures

| Conditions | DL1 | DL2 | DL3 |
|---|---|---|---|
| Idle | 1 | 1 | 1 |
| Calling | 0 | 1 | 1 |
| Communicating | 0 | 0 | 0 |
| False Call | 0 | 0 | 1 |
| After False Call | 1 | 0 | 1 |

TELEPHONE SUBSCRIBER LINE CIRCUIT

The present invention concerns individual telephone line equipment, or line circuitry, which can be used in automatic telephone exchanges. The equipment enables the condition of a subscriber's line to be identified.

In every telephone system, it is necessary to detect the conditions which a subscriber's line has assumed. For instance, it is necessary to detect the lifting and the replacement of the subscriber's station handset.

As a general rule, a subscriber's line can be in one of three different conditions:

it can be free and have current supplied by its individual equipment;

it can be connected in the exchange to a common unit which supplies current to the line and supervises the call;

finally, a line can be "parked" at the end of a call, This can result after the correspondent has replaced the handset or after an unsuccessful attempt at establishing a call due to a busy condition of the called line or to congestion of the telephone network. In these circumstances, the line is supplied with current by its individual equipment and receives from this equipment a special tone called a busy tone.

In these three conditions, the line can be looped or not by the telephone set connected to the line. It is looped when the handset is lifted, and not looped when the handset is replaced.

In the free line condition, if the line is not looped, it is in a condition called the "rest condition." If it is looped, it means that the handset has just been lifted and the line is said to be "calling."

In the condition of a line which is busy with a call, it matters little whether the line is looped or not, the line being, as previously mentioned, supervised by the common unit of the exchange to which it is connected.

In the parked line condition, if the line is looped, it is in the so called "false call condition." If it is not looped, in consequence of replacement of the handset, it has left the "false call condition."

In electronic control systems, the different conditions that a telephone line can assume are generally detected by means of cyclic scanning. At each scanning step, during a short time interval, a scanner reads the condition that a subscriber's line assumes. All the lines are thus scanned in a cycle.

The individual equipment (or line circuit) of a line includes, in these systems, a circuit provided to receive an interrogation impulse and to signal in exchange the line condition, when the latter is scanned. This circuit must operate satisfactorily under difficult conditions, as it is directly connected to a telephone line exposed to external influences. Moreover, it is important that the operation of this circuit not affect the line and, more particularly, is not perceptible by the subscriber which allows a permanent connection to the line. Finally, the intensive use of this circuit in an exchange (an individual equipment for each subscriber's line) requires that it should be economical and compact. Its embodiment is, therefore, very important.

The invention then provides a telephone line individual equipment comprising a line circuit enabling the condition of a telephone line to be identified. This circuit is combined with a circuit for detecting the presence or the absence of a loop on telephone line wires like the one described in the Spanish Pat. application No. 384,058 filed on the 29th of Sept., 1970 in the name of the: Standard Electrica S.A. ITTLS, under the title: "Circuito de prueba del estado de una linea de dos hilos" (condition test circuit for a two-wire line). The combination enables the different states that a telephone line can assume to be identified. The design of this equipment is such that its embodiment is particularly simple, economical and compact.

Such an equipment must comprise at least a feeding potential source, a supply circuit associated with the line and two feeding terminals as well as switching means provided to connect the feeding potential source to the feeding terminals. This is necessary in order that the individual equipment may feed the line when it is not connected through the exchange and a loop test circuit enabling to detect and signal if the line is looped or not. It is characterized in that it comprises besides:

a diode connected in series between one of the line wires and the corresponding feeding terminal, this diode being conducting with respect to the feeding current provided by the equipment;

a resistive bias circuit connected to the feeding terminal with which the previous diode is associated;

a feeding test circuit enabling the potential existing on the considered feeding terminal to be evaluated and signalled.

The arrangement is such that if the line is fed by its individual equipment (case of a free line), the considered feeding terminal is connected to the potential source and the potential existing on this terminal is that of that source. If the line is connected in the exchange (case of a busy line), the potential of the feeding terminal is the one applied by the bias circuit, so that the information provided by the feeding test circuit may correspond to the line condition (free or busy) and enable the information provided by the loop test circuit to be interpreted for identification without any risk of error in the particular state of the line (looped free line, that is to say calling line, for instance).

Different other objects and features of the invention will become apparent from the following description of a preferred embodiment thereof, taken in conjunction with the accompanying drawings, wherein.

Figures 1, 2:
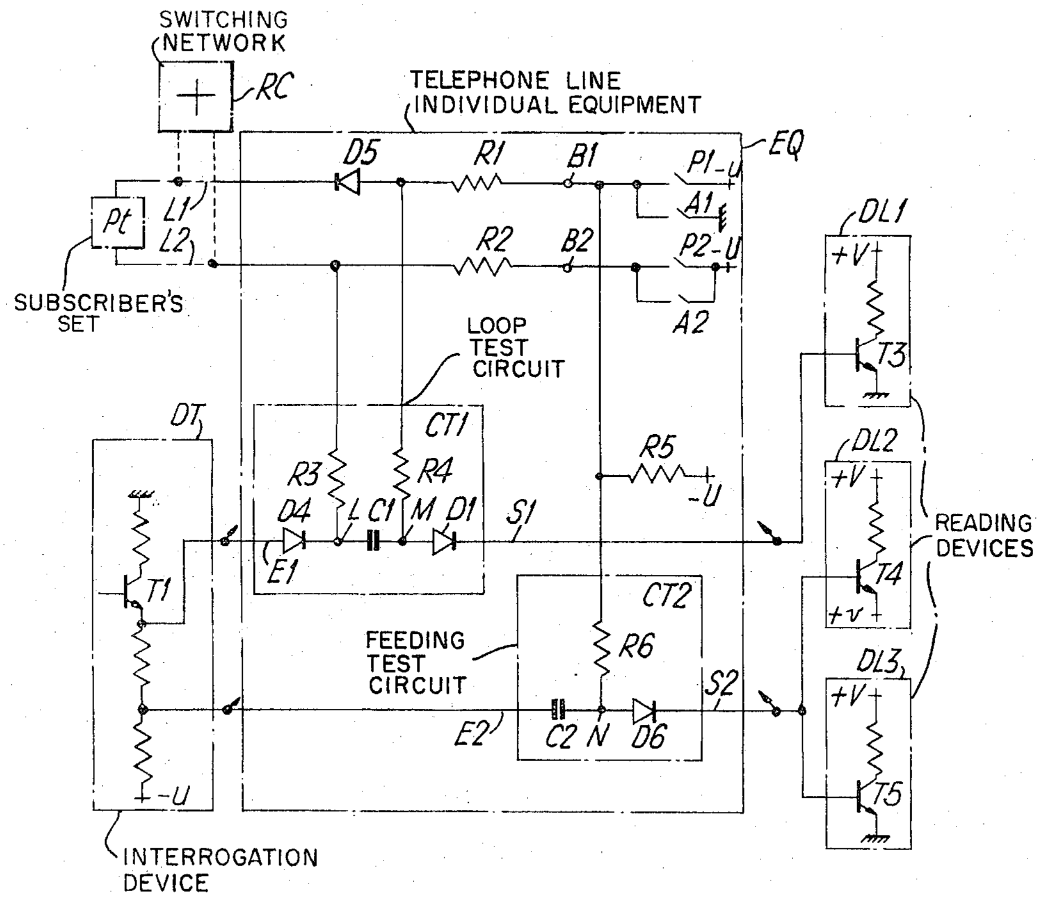
FIG. 1, is the diagram of an embodiment of the invention.
FIG. 2, is a recapitulatory table for the operation of the equipment of FIG. 1.

On FIG. 1, one can see essentially:

a telephone line with two wires L1 and L2;

a subscriber's set Pt connected to the wires L1 and L2;

a switching network RC to which are connected the wires L1 and L2;

a telephone line individual equipment EQ connected to the wires L1 and L2;

an interrogation device DT;

reading devices DL1, DL2 and DL3.

The switching network RC enables the connection of the line L1–L2 to an appropriate common unit of the exchange with a view to establishing a call.

The line L1–L2, when it is not connected through the network RC to a common unit of the exchange, is fed by its individual equipment. For that purpose, if it is in the condition "free line," means not represented close the contacts A1, A2. The earth is applied to the terminal B1 of the wire L1 and a potential –U to the terminal B2 of the wire L2. If the line is in the condition "parked line," the contacts P1 and P2 are closed by means not represented (while the contacts A1, A2 are open). A potential $-u$ is applied to the terminal B1 and the potential –U to the terminal B2. When the line is connected through the network RC to a common unit of the exchange (condition of a "connected line"), this common unit feeds the line and generally provides the earth upon one wire (L1 or L2) and a negative potential, –U for instance, on the other wire (L2 or L1).

The line condition test is made in the individual equipment with a loop test circuit CT1, such as described in the patent application already mentioned, connected to the wire L1, through the diode D5, and to the wire L2, and with a feeding test circuit CT2 connected to the terminal B1. Moreover, a bias circuit (potential –U and resistor R5), the function of which will be subsequently disclosed is connected to the terminal B1. The circuit CT1 is in a condition which depends upon the fact that the line is looped or not. In the same way, the circuit CT2 is in a condition corresponding to the line condition (free, parked, connected).

Besides, the device DT applies positive interrogation impulses at regular intervals to the inputs E1 and E2 of the test circuits CT1 and CT2. As a response, the circuit CT1 provides on its output S1 a positive potential if the line is not looped and provides nothing in the contrary case. The reading device DL1 connected to this output detects every positive potential supplied by the circuit CT1. In the same way, the circuit CT2 provides on its output S2, as a response to an interrogation impulse, a potential the level of which depends upon the circuit condition CT2, consequently the line condition. The reading devices DL2 and DL3 detect these potentials. Thus, if the line is free, the circuit CT2 provides a potential higher than a determined level ($+v$) and the two reading devices DL2 and DL3 detect this potential. If the line is parked, the circuit CT2 supplies a positive potential lower than $+v$ and only the device DL3 detects this potential. If the line is connected, no potential is provided and the devices DL2, DL3 do not respond. The combination of the results provided by the reading devices DL2 and DL3 characterizes the line condition and enables the information provided by the reading device DL1 of the loop test circuit CT1 to be interpreted to identify the line state.

It is to be noted that the device DT can interrogate simultaneously several individual telephone line equipments. For that purpose, the multipling arrows set on the connecting wires of the device DT towards the inputs E1 and E2 of the test circuits CT1 and CT2 indicate that the device DC has access to several subscriber's line individual equipments. In the same way, the reading devices DL1, DL2 and DL3 are also multipled on several subscriber's line individual equipments. The whole makes up a matrix-type line scanner.

The detailed operation of the system of FIG. 1 will be now described by considering, for example, the different successive states that a telephone line can normally assume during the establishment of a call. These are: line in rest condition (before the establishment of the call); calling line (when the line is calling); then line connected (when the calling line is connected to the called line); line in false call condition (when a communication cannot be obtained); and finally, restoring to the rest condition from the false call condition.

The reader will be referred to the table of FIG. 2 to summarize the results obtained in the different considered cases. The different states, such as those previously defined, that a telephone line can assume can be found in the "CONDITIONS" column of this table. Indications 1 or 0 can be found in the columns DL1, DL2 and DL3. An indication 1 means, for the devices DL1 and DL3, that during an interrogation, the corresponding reading device has detected a positive potential at the output (S1, S2) of the associated test circuit and, for the device DL2, that it has detected a response impulse the level of which is higher than $+v$. An indication 0 means that the reading device has detected nothing.

To make the description easier, it will be assumed that the potential –U is equal to –48V, the potential $-u$ is equal to –6 volts and the resistances R1 and R2 and the resistance of the loop of the line wires L1 and L2 are equal. Moreover, it will be supposed that during a test, a positive impulse applied to the base of the transistor T1 makes the latter conducting, the potential of the wire E1 passes from the value $-U = -48$V to –19V, which gives an interrogation impulse of an amplitude of 29V; the potential of the wire E2 passes from –48V to –30V, which gives an interrogation impulse of an amplitude of 18V. Finally, the potential $+v$ (emitter of the transistor T4 of the device DL2) is chosen fairly equal to +15V.

The case of a line in rest condition that is to say not looped and fed by the contacts A1 and A2 will be then firstly considered.

The potentials earth and –U provided by the contacts A1 and A2 are transmitted by the resistors R4 and R3 at the terminals of the capacitor C1. The point L is at the potential $-U = 48$V, the point M, at the earth potential. The capacitor C1 is charged. A positive interrogation impulse (29 volts) applied to the input E1 by the test device DT is transmitted by the diode D4 and the capacitor C1, so that a positive potential of an amplitude substantially equal to the amplitude of the interrogation impulse appears at the point M; this potential transmitted by the diode D1 on the output S1, renders the transistor T3 conducting. The reading device DL1 operates, which characterizes that the line is not looped.

The earth potential provided by the contact A1 is transmitted, by the resistor R6 of the test circuit CT2, to the point N which is then at the earth potential. The capacitor C2 is charged. A positive interrogation impulse (18 volts) applied to the input E2 by the test device DT is transmitted by the capacitor C2, so that a positive potential of an amplitude substantially equal to the amplitude of the interrogation impulse (+18V) appears at the point N. This potential is transmitted by the diode D6 to the output S2; it is higher than the potentials of the emitters of the transistors T4, T5 (of DL2 and DL3) which thus become conducting. The devices DL2 and DL3 operate, which characterizes that the terminal B1 of the wire L1 is at the earth potential and that, consequently, the contacts A1 and A2 are closed, which feeds the line between the potential –U and the earth.

The operation of the devices DL2 and DL3 indicates that the line is free. The operation of DL1 indicates that it is not looped. Consequently, it is in rest condition, as indicated on the first line of the table of FIG. 2.

The case of a calling line is now considered, that is to say always fed by the contacts A1 and A2, but looped. It is remembered that the resistance of the loop of the line wires L1 and L2 is equal to the resistances R1 and R2.

The potentials of the connecting points of the test circuit CT1 to the wires L1 and L2 are $-U/3 = -16V$ for the wire L1 and $2U/3 = 32V$ for the wire L2. The diodes D1 and D4 are blocked and the potentials of the points L and M are respectively −32V and −16V. An interrogation impulse applied to the input E1 renders the diode D4 conducting (save at the threshold of the diode D4) only during the portion of the impulse ranging from −32V to −19V. The impulse supplied to the capacitor C1 has therefore an amplitude of 32V − 19V = 13V only and a potential of −16V +13V = −3V appears at the point M. The transistor T3 cannot be then rendered conducting and the device DL1 does not operate, which indicates that the line is looped.

The earth potential provided by the contact A1 is transmitted by the resistance R6 of the test circuit CT2, to the point N which is therefore at the earth potential. During the test, the test circuit CT2 behaves as previously. The devices DL2 and DL3 operate which characterizes the fact that the line is fed between the potential −U and the earth.

The operation of the devices DL2 and DL3 means that the line is free. The non-operation of DL1 means that it is looped. Consequently, the subscriber has just lifted the handset off its set and the information provided by DL1, DL2 and DL3 correspond to the detection of a new call as indicated on the second line of the table of FIG. 2.

The case of a connected line is now considered, that is to say connected through the switching network RC to a unit of the exchange which feeds the line. It can be noted that the contacts A1, A2 and P1, P2 are open in this case.

In case the line feeding is such that the wire L1 is at a negative potential of −48V, the wire L2 at the earth potential, the point L is at the earth potential and blocks the diode D4. During a test, an interrogation impulse supplied by the device DT upon the wire E1 is, therefore, ineffective. The device DL1 cannot therefore operate.

In the test circuit CT2, the point N is at the potential −48V of the wire L1. An interrogation impulse of +18V on the input E2 gives rise to a negative potential of −30V on the output S2. The devices DL2 and DL3 cannot then operate.

In case the line feeding direction is inverted with respect to the previous case, which means that L1 is at the earth potential and L2 at the negative potential −48V, the earth potential of the wire L1 is blocked by the diode D5 and the negative potential −U is applied to the terminal B1 by the resistor R5. The points L, M and N are then at the potential $-U = -48V$. In the test circuit CT1, as a response to an interrogation impulse of +29V, a potential of −48V + 29V = −19V appears at the point M. The device DL1 does not then operate. In the same way, in the test circuit CT2, an interrogator impulse of +18V gives rise to a potential of −48V + 18V = −30V at the point N. The devices DL2 and DL3 do not then operate either.

It follows that, if the line is connected to a central unit and whatever the direction of its feeding may be, the devices DL1, DL2, DL3 do not operate, which caharacterizes this condition, as indicated on the third line of the table of FIG. 2.

The case of a line in false call condition, that is to say looped and fed by the contacts P1 and P2 will be now considered.

The potentials of the connecting points of the test circuit CT1 to the wires L1 and L2 are $-U + u/3 = -48V + 6V/3 = 14V$ for the wire L1 and $2(-U + u)/3 = -28V$ for the wire L2. The diodes D1 and D4 are blocked and the potentials of the points L and M are respectively −28V and −14V. An interrogation impulse applied to the input E1 renders the diode D4 conducting (save at the threshold of the diode) only during the portion of the impulse ranging from −28V to 19v. The impulse supplied to the capacitor C1 has consequently an amplitude of only 28V − 19V = 9V and a potential of −14V + 9V = −5V appears at the point M. The device DL1 does not operate, which indicates that the line is looped.

In the test circuit CT2, the point N is at the potential $-u = -6V$. An interrogation impulse of +18V applied to the input E2 is transmitted by the capacitor C2, so that a potential of 18V − 6V = +12V appears at the point N. This potential being lower than the potential $+v = +15$, the device DL2 does not operate, while the device DL3 operates, which indicates that the line is fed by the contacts P1 and P2.

The non-operation of the devices DL1 and DL2 and the operation of the device DL3 then characterizes the fact that the line is in false call condition as indicated on the fourth line of the table of FIG. 2.

The case of a line which previously in the false call condition, is released, the line subscriber having replaced the handset of his set, will be finally considered. The line wires are then no longer looped, but are always fed by the contacts P1 and P2.

In the test circuit CT2, the point N is at the potential $-u = 6V$. The circuit CT2 responds in the same way as in the case of a line in false call condition to an impulse applied on the wire E2. The device DL2 does not operate and the device DL3 operates, which indicates that the line is fed by the contacts P1 and P2.

The operation of the device DL1 means that the line is not looped. The non-operation of the device DL2 and the operation of the device DL3 mean that the line is in the parked condition (fed by the contacts P1 and P2). Consequently, as the line is previously in the false call condition, the subscriber has just replaced the handset of this station and the information provided by DL1, DL2, DL3 correspond to a line leaving the parked condition, as indicated on the fifth line of the table of FIG. 2 (end of FC).

It can be seen that the identification of the line condition, associated with the loop detection of the line (or loop opening) like the one made with the line individual equipment of the invention, enables the identification of the different conditions that a telephone line can assume.

It is clearly understood that the preceding descriptions are made only by way of example and not as limitation to the scope of the invention. The numerical examples, more particularly, have been only given to make the description easier.

We claim:

1. Telephone line individual equipment for use in a telephone exchange comprising first and second line terminals, a feeding potential source, a feeding circuit including first and second feeding terminals coupled to the respective line terminals, switching means provided to connect the feeding potential source to the feeding terminals to supply potentials to the individual equipment when it is not connected through an exchange, a loop test circuit coupled to detect and signal whether a line coupled to the first and second line terminals is looped or not, a first diode connected in series between a first line terminal and the corresponding first feeding terminal, said diode being rendered conductive by potential supplied over the first feeding terminal, a resistive bias circuit connected to the first feeding terminal, a feeding test circuit coupled to said first feeding terminal to enable potential existing on said first feeding terminal to be evaluated and signalled, the feeding test circuit including means determinative that the line is fed by its individual equipment when said first feeding terminal is connected to the potential source and the potential existing on the terminal is that of this source, said feeding test circuit including means determining when the line is connected in the exchange that the potential of the feeding terminal is the one applied by the bias circuit, so that the information provided by the feeding test circuit indicates the line condition and enables the information provided by the loop test circuit to be interpreted to identify the particular condition of the line.

2. Telephone line individual equipment as defined in claim 1, in which the feeding test circuit includes a test input connected to one of the terminals of a capacitor the other terminal of which is connected to the first feeding terminal and the resistive bias circuit, the feeding test circuit being coupled to a reading output through a decoupling diode, said feeding test circuit responding to an interrogation impulse applied to the test input to provide an impulse to the reading output the level of which depends upon the potential of the feeding terminal to which the feeding test circuit is connected.

3. Telephone line individual equipment as defined in claim 1, in which at least two feeding potential sources connectable to the two feeding terminals and corresponding to two different conditions of the line are provided, the feeding test circuit providing, as a response to an interrogation impulse, an output potential the level of which depends upon the feeding potential of the line and thus characterizes the line condition.

4. Telephone line individual equipment as defined in claim 1, in which there is provided an interrogation device applying an interrogation impulse to the loop test circuit and to the feeding test circuit, a reading device associated with the loop test circuit to detect the response of the latter to an interrogation impulse, a plurality of reading devices associated with the feeding test circuit to detect the response of the latter to an interrogation impulse, the combination of the indications provided by these reading devices, in response to interrogation impulses enabling the different conditions that the telephone line can assume to be identified.

* * * * *